United States Patent [19]

Phillips

[11] Patent Number: 4,717,296
[45] Date of Patent: Jan. 5, 1988

[54] METHOD AND APPARATUS FOR FINISHING WORKPIECES

[75] Inventor: James D. Phillips, Posen, Mich.

[73] Assignee: J. D. Phillips Corporation, Alpena, Mich.

[21] Appl. No.: 895,333

[22] Filed: Aug. 11, 1986

[51] Int. Cl.⁴ .......................... B23C 3/04; B23C 3/14
[52] U.S. Cl. .............................. 409/132; 29/33 C; 29/527.6; 82/1 C; 409/166
[58] Field of Search .............. 409/165, 166, 199, 131, 409/132; 29/33 A, 33 C, 156.5 R, 527.6, DIG. 19, DIG. 26; 82/1 C, 18, 19; 407/49; 225/1, 93, 94

[56] References Cited

U.S. PATENT DOCUMENTS 2,208,572  7/1940  Drummond ..................... 409/165
4,205,933  6/1980  Loladze et al. .................. 409/132
4,535,216  8/1985  Cassidenti ...................... 82/1 C X
4,614,463  9/1986  Hughes ............................ 407/49

Primary Examiner—Gil Weidenfeld
Assistant Examiner—Steven C. Bishop
Attorney, Agent, or Firm—Barnes, Kisselle, Raisch, Choate, Whittemore & Hulbert

[57] ABSTRACT

A method of rough finishing a piston, including removing gates and sprues, while the piston is rotated at a relatively slow speed. A rotating milling cutter provided with a multiplicity of cutting elements is positioned relative to the rotating piston such that the cutting elements successively engage and remove stock (chips) from the surface of the rotating piston. The milling cutter is rotated sufficiently rapidly to produce enough surface speed to generate the heat necessary to render the chips molten. An apparatus for carrying out the method is also disclosed.

5 Claims, 4 Drawing Figures

METHOD AND APPARATUS FOR FINISHING WORKPIECES

This invention relates generally to removal of stock from workpieces and refers more particularly to a method and apparatus for rough finishing a piston or the like.

BACKGROUND AND SUMMARY OF THE INVENTION

Pistons of aluminum or cast iron are molded in a procedure which produces excess stock, including gates and sprues. After the piston has been molded, and in accordance with conventional practice, the sprues on the side of the piston are broken off, the gates on the end are sawed off, and the piston is then rough finish machined to remove the remaining excess stock. After rough finishing, the piston may be annealed and then finish machined. Rough finishing is done by rapidly rotating the piston and turning it against a single point tool on the side of the piston and also against a single point tool on the end of the piston. Rotation of the piston is sufficiently rapid to produce enough surface speed to generate the heat necessary to render the chips molten, so that less power is required. However, high speed rotation of the piston may cause it to expand by centrifugal force, and if the piston wall is of non-uniform thickness circumferentially, the piston will expand unevenly and become distorted. Distortion of the piston results in uneven stock removal.

This invention involves the rough finishing of a piston or the like, in which turning by a single point tool or tools is replaced by milling. A milling cutter rotated at high speed removes excess stock from a relatively slowly rotating piston. As with single point turning, high surface speed is necessary in order to produce molten chips. However, with the present invention in which a rapidly rotating milling cutter is employed, the piston needs to be turned only relatively slowly at speeds such that centrifugal force does not cause distortion. The sprues on the side of the piston are broken off before milling. However, the gates on the end of the piston are removed by the milling cutter. Thus this invention eliminates the necessity of sawing off the gates.

In accordance with the method and apparatus of this invention, the piston is rotated relatively slowly and a relatively rapidly rotating milling cutter is moved along the rotating piston in a manner such that the cutting elements of the milling cutter successively engage and remove stock from the surface of the piston. The milling cutter is guided along a path for rough finishing both the end and side surfaces of the piston.

These and other objects of the invention will become more apparent as the following description proceeds, especially when considered with the accompanying drawings.

DETAILED DESCRIPTION

Figure 1:
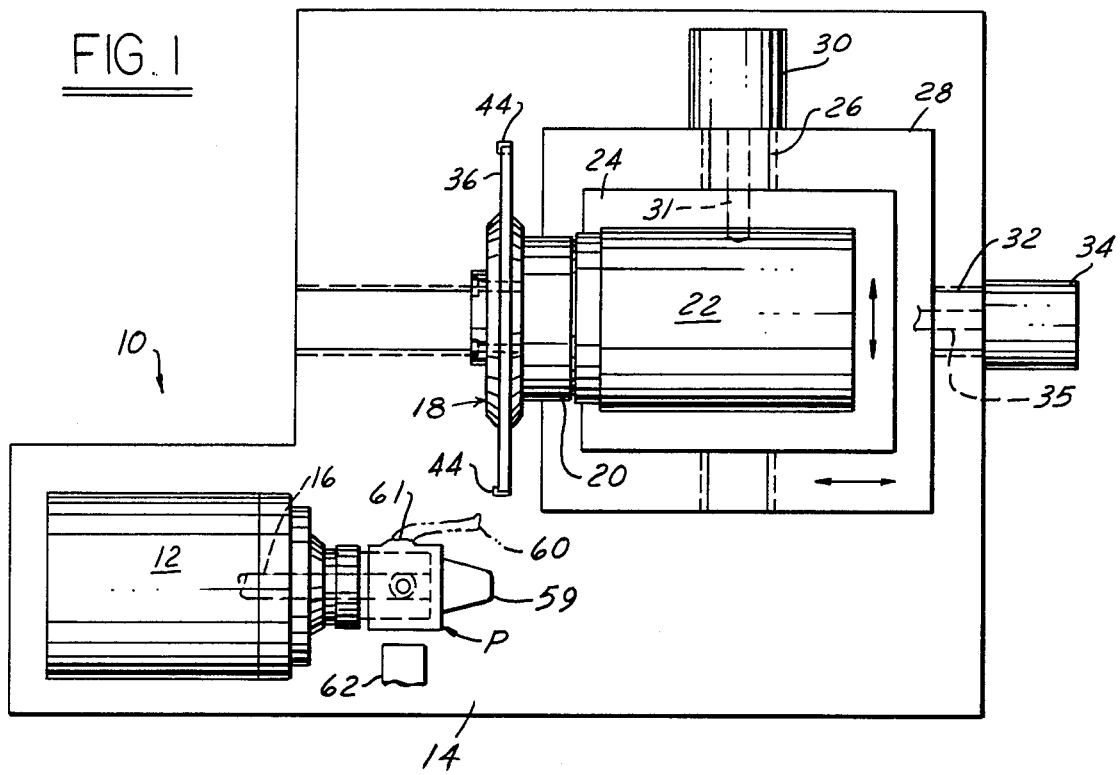
FIG. 1 is a plan view of apparatus for practicing the method of this invention.

Referring now more particularly to the drawings and especially FIG. 1 thereof, the numeral 10 designates a milling machine having a head stock 12 mounted on a base 14 and including a motor drive for turning a work spindle 16. A milling cutter 18 is mounted on the shaft 20 of a motor drive 22 which rotates the shaft and hence the milling cutter. Shaft 20 is parallel to work spindle 16.

The motor drive 22 is mounted on a table 24 which in turn is mounted on ways 26 of a slide 28 for movement of the table in opposite directions in a path at right angles to the axis of the work spindle 16. The table 24 is moved by a reversible motor 30 and ball screw drive 31.

The slide 28 is mounted on ways 32 of a lateral extension of the base for sliding movement in opposite directions parallel to the axis of the work spindle 16. The slide is moved in opposite directions by a reversible motor 34 and ball screw drive 35.

The radially outer portion 36 of the cutter has parallel side surfaces 38 and 40 and is provided with a multiplicity of rectangular cutting elements 44 equally spaced apart along its periphery. Each cutting element is secured in a notch 45 extending completely across the radially outer edge of the radially outer portion 36 of the cutter and is secured in position by a wedge 48 held in place by a set screw 50. Each cutting element is slightly greater in width than the thickness of the radially outer portion 36 and slightly greater in length than the depth of the notch in which it is mounted. Each cutting element is mounted so that one side edge is flush with one side 40 of the cutter and the opposite side edge 51 projects axially beyond the opposite side 38 of the cutter. The radially outer edges 53 of the cutting elements project beyond the periphery of the cutter.

Mounted on the work spindle 16 is a workpiece which in this instance is a piston P of aluminum or cast iron, for example. The piston P has a head 52. A cylindrical skirt 54 extends from one side of the head and has the usual internal journals 55 for receiving a pin by means of which it may be connected to a piston rod. The journals 55 make the skirt nonuniform circumferentially, which could cause distortion if the piston is rotated too rapidly. The piston is sleeved over and mounted on the work spindle 16 with its axis coinciding with that of the work spindle. Any suitable means may be employed to mount the piston on the work spindle such, for example, as the cross pin 58.

As already stated, pistons are molded in a procedure which produces excess stock, including gates 59 and sprues 60. The sprues are broken off before milling usually leaving residual material on the side of the piston where indicated at 61. FIG. 1 shows a sprue in dotted lines. A breaker 62 is mounted on base 14 in a position to engage and break off the sprue when the piston is mounted on spindle 16 and initially rotated. Both the head and skirt of the molded piston are somewhat oversize and the excess stock must be removed. The excess stock, including the gates 59 and residual sprue material 61, are removed by milling. In carrying out the method, the milling cutter moves along the path indicated in FIG. 4.

In operation, the molded piston is mounted on the work spindle 16 in the position shown, with its axis coinciding with that of the work spindle. The work spindle is rotated relatively slowly, that is at a speed less than that at which the piston will become distorted radially by centrifugal force. Assuming an aluminum piston, a speed of about 2000 revolutions per minute (RPM) is recommended. As the spindle starts to rotate, and before milling begins, the sprue 60 will be broken off by striking the breaker 62.

The milling cutter is rotated at a speed such that the cutting elements move about 14,000 linear or surface feet per minute (SFPM), which is fast enough to generate the heat necessary to render molten the stock (chips) removed from an aluminum piston.

Figure 3:
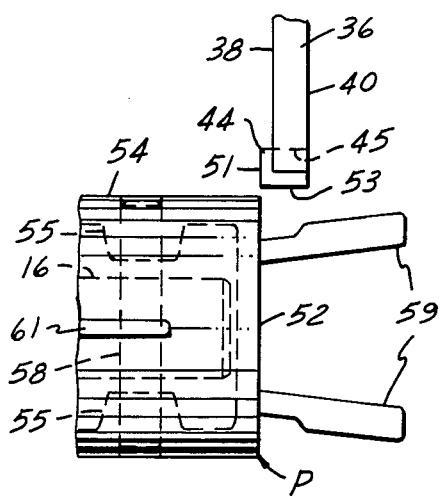
FIG. 3 is an enlarged view of a portion of the milling cutter and piston as seen in FIG. 1, with the piston turned 90° from the FIG. 1 position.
Figure 2:
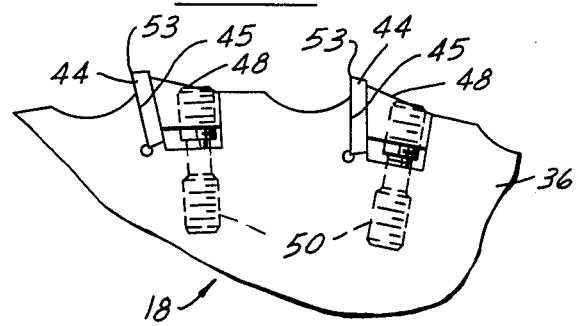
FIG. 2 is a side view of a portion of the milling cutter which forms part of the apparatus of FIG. 1.
Figure 4:
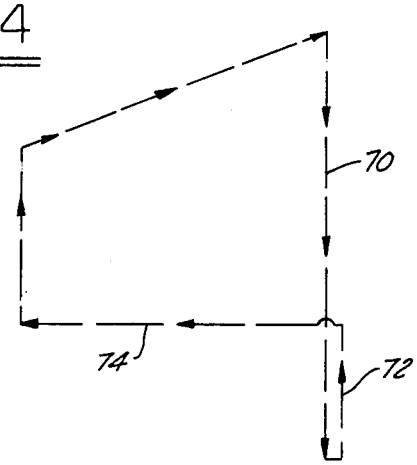
FIG. 4 is a diagram showing the path of movement of the milling cutter.

FIG. 4 shows the path of the milling cutter during rough finishing. Motors 30 and 34 are operated to place the milling cutter at the top of the portion 70 of the cutter path, which is a position about as shown in FIG. 3. Motor 30 is then operated to cause the milling cutter to move inwardly across the end of the piston following the portion 70 of the path to the midpoint of the piston and causing the side and outer edges 51 and 53 of the cutter elements to remove stock from and rough finish the entire head end surface in one pass. The gates are also removed by the cutter during this inward movement. Then by operation of motor 34, the milling cutter is moved to the right, away from the piston head, and then while clear of the piston it is moved outwardly along portion 72 of the path by motor 30. Operation of the motor 34 then causes the milling cutter to move leftward following the portion 74 of the path so that the side and radially outer edges 51 and 53 of the cutting elements remove chips and rough finish the entire side wall surface of the piston skirt. The material 61 remaining from the broken off sprues is also removed at this time. Thereafter, the motors 30 and 34 are operated to cause the milling cutter to return to its starting position along the path as indicated in FIG. 4.

The surface speed of the cutting elements is such that the excess stock or chips removed from the end and skirt surfaces of the piston become molten because of the heat generated, thus reducing the power necessary to accomplish rough finishing.

The side edges of the cutting elements opposite side edges 51 are flush with the surface 40. Being flush, the side 40 of the cutter can lend support to the gate being milled off to prevent it from breaking off prematurely because of the deflection caused by centrifugal force.

The notches in which the cutting elements are mounted are cut clear across the cutter so that the cutting elements may be reversed for rough finishing on the opposite side of the cutter.

After the piston is rough finished, it may be annealed and finish machined in the usual manner.

I claim:

1. A method of rough finishing a cylindrical workpiece such as a piston or the like having a sprue on its cylindrical surface, comprising breaking off said sprue leaving residual sprue material on said cylindrical surface, axially rotating said workpiece, providing a circular milling cutter having a multiplicity of cutting elements along its periphery, axially rotating said milling cutter, and milling said workpiece by relatively positioning said axially rotating workpiece and said axially rotating milling cutter so that said cutting elements successively engage and remove stock from the surface of said rotating workpiece, said milling including relatively moving said rotating workpiece and rotating milling cutter parallel to the workpiece axis to cause said cutting elements to engage and remove stock, including residual sprue material, from the cylindrical surface of said workpiece.

2. A method of rough finishing a cylindrical workpiece such as a piston or the like having a gate on its end surface, comprising axially rotating said workpiece, providing a circular milling cutter having a muiltiplicity of cutting elements along its periphery, axially rotating said milling cutter, and milling said workpiece by relatively positioning said axially rotating workpiece and said axially rotating milling cutter so that said cutting elements successively engage and remove stock from the surface of said rotating workpiece, said milling including relatively moving said rotating workpiece and rotating milling cutter in a direction transversely of the workpiece axis to cause said cutting elements to engage and remove stock, including said gate, from the end surface of said workpiece.

3. A method of rough finishing a cylindrical workpiece such as a piston or the like having a sprue on its cylindrical surface and a gate on its end surface, comprising breaking off said sprue leaving residual sprue material on said cylindrical surface, axially rotating said workpiece, providing a circular milling cutter having a muiltiplicity of cutting elements along its periphery, axially rotating said milling cutter, and milling said workpiece by relatively positioning said axially rotating workpiece and said axially rotating milling cutter so that said cutting elements successively engage and remove stock from the surface of said rotating workpiece, said milling including relatively moving said rotating workpiece and rotating milling cutter parallel to the workpiece axis to cause said cutting elements to engage and remove stock, including residual sprue material, from the cylindrical surface of said workpiece, and relatively moving said rotating workpiece and rotating milling cutter in a direction transversely of the workpiece axis to cause said cutting elements to engage and remove stock, including said gate, from the end surface of said workpiece.

4. A method of rough finishing a cylindrical workpiece such as a piston or the like, comprising axially rotating said workpiece, providing a circular milling cutter having a multiplicity of cutting elements along its periphery, axially rotating said milling cutter, and milling said workpiece by relatively positioning said axially rotating workpiece and said axially rotating milling cutter so that said cutting elements successively engage and remove stock from the surface of said rotating workpiece, said milling cutter being rotated sufficiently rapidly to produce enough surface speed to generate the heat necessary to render molten the stock removed by said cutting elements.

5. Apparatus for rough finishing a cylindrical workpiece such as a piston or the like, comprising means for axially rotating said workpiece, a circular milling cutter having a multiplicity of cutting elements along its periphery, means for axially rotating said milling cutter, means for relatively positioning said axially rotating workpiece and said axially rotating milling cutter so that said cutting elements successively engage and remove stock from the surface of said rotating workpiece, and a breaker mounted adjacent to said workpiece in a position to engage and break off a sprue on said workpiece upon initial rotation thereof.

* * * * *